(12) United States Patent
Kim et al.

(10) Patent No.: US 9,726,807 B2
(45) Date of Patent: Aug. 8, 2017

(54) LIGHT GUIDE PLATE, BACK LIGHT MODULE AND DISPLAY APPARATUS

(71) Applicant: BOE Technology Group Co., LTD., Beijing (CN)

(72) Inventors: Heecheol Kim, Beijing (CN); Yan Wei, Beijing (CN); Chao Xu, Beijing (CN); Chunfang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 346 days.

(21) Appl. No.: 14/164,693

(22) Filed: Jan. 27, 2014

(65) Prior Publication Data

US 2014/0301109 A1   Oct. 9, 2014

(30) Foreign Application Priority Data

Apr. 7, 2013   (CN) .......................... 2013 2 0167385

(51) Int. Cl.
*F21V 7/04*   (2006.01)
*F21V 8/00*   (2006.01)

(52) U.S. Cl.
CPC ......... *G02B 6/0063* (2013.01); *G02B 6/0055* (2013.01); *G02B 6/0076* (2013.01)

(58) Field of Classification Search
CPC .. G02B 6/0063; G02B 6/0035; G02B 6/0055; G02B 6/0076
USPC ................................................. 362/616, 623
See application file for complete search history.

(56) References Cited

U.S. PATENT DOCUMENTS

| | | | | |
|---|---|---|---|---|
| 2003/0043315 | A1* | 3/2003 | Umemoto et al. | 349/65 |
| 2007/0139966 | A1* | 6/2007 | Kim et al. | 362/616 |
| 2011/0032452 | A1* | 2/2011 | Takata | 349/62 |
| 2013/0314943 | A1* | 11/2013 | Huang | 362/606 |
| 2013/0328780 | A1* | 12/2013 | Kuroki | 345/168 |
| 2014/0233258 | A1* | 8/2014 | Zhang | G02B 6/005 |
| | | | | 362/607 |
| 2014/0264034 | A1* | 9/2014 | Cui | G06F 3/0416 |
| | | | | 250/341.8 |
| 2014/0307466 | A1* | 10/2014 | Hikmet et al. | 362/607 |
| 2015/0043243 | A1* | 2/2015 | Gourlay | 362/606 |

* cited by examiner

*Primary Examiner* — Evan Dzierzynski
(74) *Attorney, Agent, or Firm* — Westman, Champlin & Koehler, P.A.

(57) ABSTRACT

In the light guide plate, a surface of the reflection sheet away from the bottom surface is configured as a reflection surface. Regions of the light guide plate body except the reflection sheets are configured as light transmission regions. The light transmission regions and the reflection sheets are alternately arranged; a plurality of transmission protrusions are disposed at the light transmission region inside the light guide plate body; a reflection coating layer is formed on side surfaces of each of the transmission protrusion. Since the reflection sheets are provided inside the light guide plate body, the reflection sheet reflects light which is directed from the one surface and passes through the display panel, and prevents the light, directed from the other surface of the display apparatus, from passing through the display panel and interfering with the normal display of the one surface.

10 Claims, 5 Drawing Sheets

LIGHT GUIDE PLATE, BACK LIGHT MODULE AND DISPLAY APPARATUS

CROSS-REFERENCE TO RELATED APPLICATION

This application claims the benefit of Chinese Patent Application No. 201320167385.1 filed on Apr. 7, 2013 in the State Intellectual Property Office of China, the whole disclosure of which is incorporated herein by reference.

BACKGROUND OF THE INVENTION

Field of the Invention

The present invention relates to a technical field of a display, more particularly, relates to a light guide plate, a back light module and a display apparatus.

Description of the Related Art

Since a liquid crystal itself cannot emit a light, a back light module is an important component of a liquid crystal display for emitting light. The back light module is used to provide an illuminant having a sufficient brightness and an even distribution luminance to ensure that the liquid crystal can normally display an image. Currently, the display technology of the liquid crystal display has been very perfect, and the design on the back light module also has been greatly improved. In addition to the liquid crystal display and the liquid crystal TV, the back light module also can be used as an illuminant for other display apparatus, such as, a digital picture frame, an electronic paper, a mobile telephone, etc.

The back light module can be classified into a downright back light module and a side back light module according to positions of the illuminant. As for the downright back light module, the illuminant is just placed a rear of a light incident surface of a light guide plate, and the light from the illuminant becomes plane light from a plane light source after passing through a section of space and being diffused by a diffusion plate and mixed. As for the side back light module, the illuminant is often placed on at least one side of the light guide plate, and the light is coupled to the side and directed into the light guide plate, then formed as a total reflection inside the light guide plate and propagated forward. By destroying the total reflection condition, the light can be evenly irradiated from the light emitting surface of the light guide plate. Accordingly, the configuration of the light guide plate has an important effect on the light emitting effect of the back light module.

FIG. 1 is an illustrative configuration view of a light guide plate in the prior arts. As shown in FIG. 1, the light guide plate comprises an incident surface 1 for receiving a light beam, a bottom surface 3 connected to the incident surface, an emitting surface 2 connected to the incident surface 1 and opposite to the bottom surface 3, a side surface 4 opposite to the incident surface 1, and two rest side surfaces. In order to destroy the total reflection of the light beam inside the light guide plate, an optical screen element 5 is disposed on the bottom surface 3. The incident light is directed into the light guide plate and is totally reflected many times inside the light guide plate and diffused into all space inside the light guide plate. When the incident light reaches the optical screen element 5, the incident light is diffused by the optical screen element 5 and emitted from the light emitting surface 2 of the light guide plate (the bottom surface of the light guide plate is light proof). By adjusting the density of the optical screen element 5, the luminance of the emitted light can be evenly distributed on the whole light emitting surface of the light guide plate. An illuminant 6 is provided outside the incident surface 1 of the light guide plate. A reflection case 7 is provided on the illuminant 6. Reflection sheets are provided on the side surface 4 and the other side surfaces to form reflection surfaces. The light emitted from the illuminant 6 is directed into the light guide plate through the incident surface 1, and led out from the light emitting surface 2 after being reflected by the bottom surface 3 and the side surface 4.

It should be appreciated for those skilled in this art that the above illuminant may be provided on at least one side surface of the light guide plate. For the purpose of description, the illuminant is provided on only one side surface of the light guide plate as shown in FIG. 1.

The conventional display apparatus generally has a single display surface. Thereby the light guide plate of the back light module only can emit the light from a single surface, that is, from the light emitting surface, and cannot satisfy the requirement of the double-surface display apparatus.

SUMMARY OF THE INVENTION

The present invention has been made to overcome or alleviate at least one aspect of the above mentioned disadvantages.

Accordingly, it is an object of the present invention to provide a light guide plate, a back light module having the light guide plate, and a display apparatus having the back light module that can achieve the double-surface display.

According to an aspect of the present invention, there is provided a light guide plate, comprising: a transparent light guide plate body; and a plurality of reflection sheets disposed inside the light guide plate body adjacent to a bottom surface of the light guide plate body, wherein a surface of the reflection sheet opposite to the bottom surface is configured as a reflection surface, wherein regions of the light guide plate body except the reflection sheets are configured as light transmission regions, and wherein the light transmission regions and the reflection sheets are alternately arranged.

According to another aspect of the present invention, there is provided a back light module comprising a light guide plate according to the above embodiment.

According to another aspect of the present invention, there is provided a display apparatus, comprising: a display panel having two light transmission surfaces opposite to each other; and two back light modules according to the above embodiment, wherein the two back light modules are disposed at sides of the two light transmission surfaces, respectively, and wherein the surface of the respective light guide plate body facing the bottom surface thereof is located adjacent to the respective light transmission surface of the display panel.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
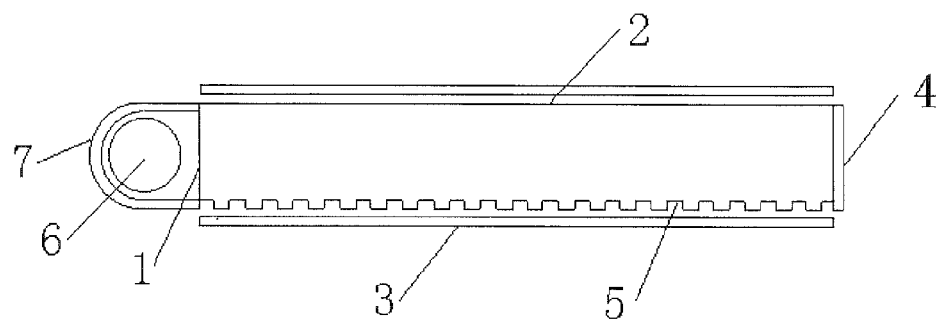
FIG. 1 is an illustrative view of a conventional light guide plate in the prior arts.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to an general concept of the present invention, there is provided a light guide plate, comprising: a transparent light guide plate body; and a plurality of reflection sheets disposed inside the light guide plate body adjacent to a bottom surface of the light guide plate body, wherein a surface of the reflection sheet away from the bottom surface is configured as a reflection surface, wherein regions of the light guide plate body except the reflection sheets are configured as light transmission regions, and the light transmission regions and the reflection sheets are alternately arranged.

Figure 2:
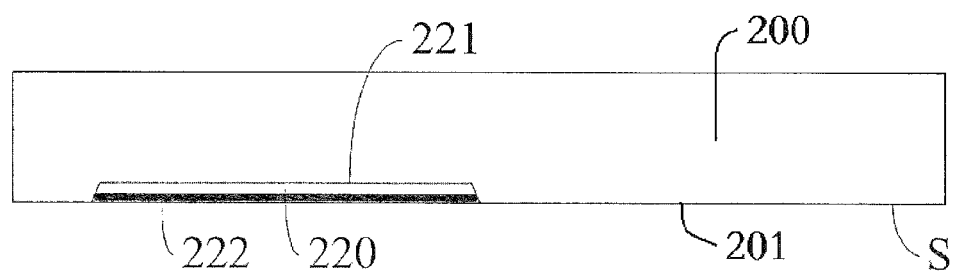
FIG. 2 is an illustrative cross section view of a light guide plate according to a first exemplary embodiment of the present invention.
Figure 3:
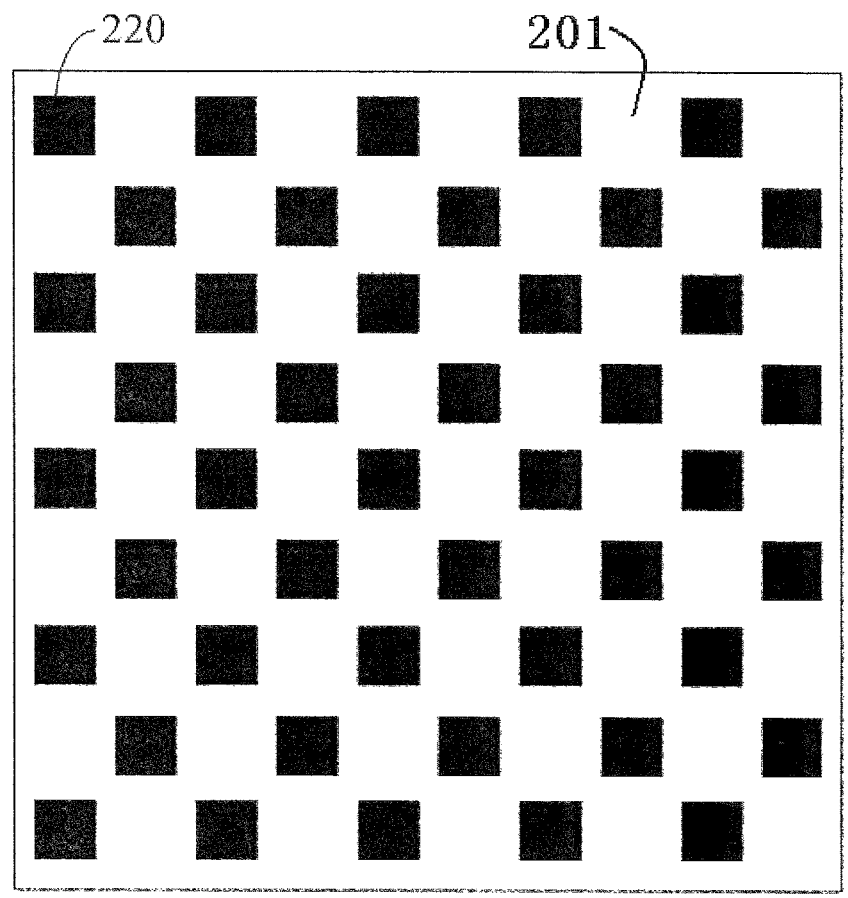
FIG. 3 is an illustrative plan view of the light guide plate of FIG. 2.

FIG. 2 is an illustrative cross section view of a light guide plate according to a first exemplary embodiment of the present invention; and FIG. 3 is an illustrative plan view of the light guide plate of FIG. 2.

As shown in FIGS. 2-3, according to the light guide plate of the present invention, the plurality of reflection sheets 220 are disposed inside the light guide plate body 200 adjacent to the bottom surface S of the light guide plate body 200. The light guide plate body 200 itself is made of a transparent material, and thereby the regions of the light guide plate body 200 except the reflection sheets 220 are configured as the light transmission regions 201, that is, the regions of the light guide plate body 200 without the reflection sheets 220 are configured as the light transmission regions 201 for allowing the light to transmit therethrough. A surface (an upper surface as shown in FIG. 2) of the reflection sheet 220 away from the bottom surface S is configured as a reflection surface 221 for reflecting the light. The reflection surface 221 is often formed by coating a reflection material (for example, a metal coating layer) on the surface of the reflection sheet 220 opposite to the bottom surface S. In order that double surfaces of a display apparatus can independently display images without interference with each other, the light transmission regions 201 and the reflection sheets 220 are alternately arranged.

In an exemplary embodiment, in order that the light directed into and led out the light guide plate body 200 can be evenly distributed, the reflection sheets 220 are evenly arranged inside the light guide plate body 200, and the light transmission regions 201 are also evenly arranged inside the light guide plate body 200 accordingly. FIG. 3 shows an exemplary embodiment in which the reflection sheets 220 and the transmission regions 201 are evenly arranged inside the light guide plate body 200.

As it will be described later with reference to FIG. 9, the light enters into a display panel of a display apparatus through the transmission region from one of the double surfaces of the display apparatus. The reflection sheet 220 reflects the light which is directed from the one surface and passes through the display panel, and prevents the light, which is directed from the other surface of the display apparatus, from passing through the display panel and interfering with the normal display of the one surface. In this way, the display apparatus can achieve the double-surface display.

In another exemplary embodiment, since the reflection surface 221 is often formed by a reflection coating layer both sides of which have the reflection function. In order to prevent a flashing light due to the both sides reflection of the reflection coating layer from interfering with a viewer, a first non-reflection coating layer 222 is formed on a surface of the reflection sheet 220 facing the bottom surface S. The first non-reflection coating layer 222 may be located under the reflection surface 221 with respect to the bottom surface S as shown in FIG. 2, that is, the reflection surface 221 formed by the reflection material coating layer is covered on the first non-reflection coating layer 222. Alternatively, the first non-reflection coating layer 222 may be formed on a region of the bottom surface S of the light guide plate body 200 corresponding to the reflection sheet 220.

Figure 4:
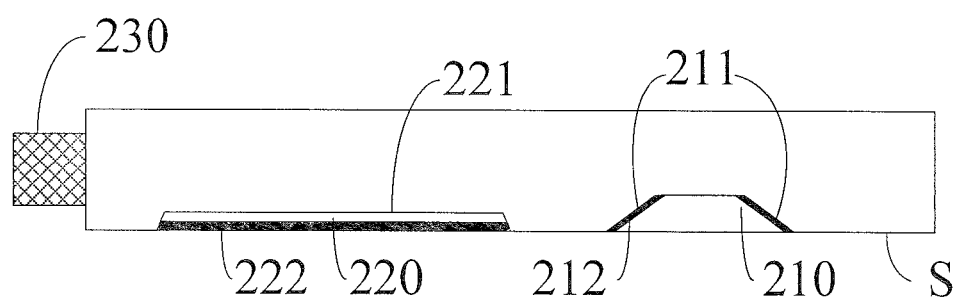
FIG. 4 is an illustrative cross section view of a light guide plate according to a second exemplary embodiment of the present invention.

Since an external light can enter into the light guide plate body 200 from the transmission region 201, it is not necessary to provide an internal light source inside the light guide plate. However, if the external light is not sufficient, as shown in FIG. 4, at least one light source 230 is provided on at least one side surface of the light guide plate body 200 perpendicular to the bottom surface S to ensure the normal display. The light source 230 may comprise an illuminant (for example, LED) and a reflection shield enclosing the illuminant. The side surfaces of the light guide plate body 200 perpendicular to the bottom surface S are defined as a light incident surface, and this light guide plate may be called as a side light guide plate.

Generally, there are four side surfaces perpendicular to the bottom surface S, and the four side surfaces each may be provided with the light source 230 thereon, or one or more of the four side surfaces may be provided with one or more light sources 230 thereon. As a result, even if the external light source is not sufficient, the internal light source 230 can ensure the normal display. In an exemplary embodiment, a light sensor may be provided in a drive circuit of a back light module to detect the intensity of the external light and determine to adopt only the external light source, only the internal light source, or both the external and internal light sources to display.

In case where only the internal light source is adopted to display, in order to ensure that the light from the light source 230 can effectively reach the surface opposite to the bottom surface S, as shown in FIG. 4, a plurality of transmission protrusions 210 are provided at the light transmission region 201 inside the light guide plate body 200. A reflection coating layer 211 is formed on side surfaces of each of the transmission protrusion 210. With this configuration, the light from the light source 230 can be emitted from the surface opposite to the bottom surface S after being reflected by the reflection coating layer 211. In an exemplary embodiment, in order to prevent a flashing light due to both sides reflection of the reflection coating layer 211 from interfering with a viewer, a second non-reflection coating layer 212 is formed between the side surface of the transmission protrusion 210 and the reflection coating layer 211.

Figure 5:
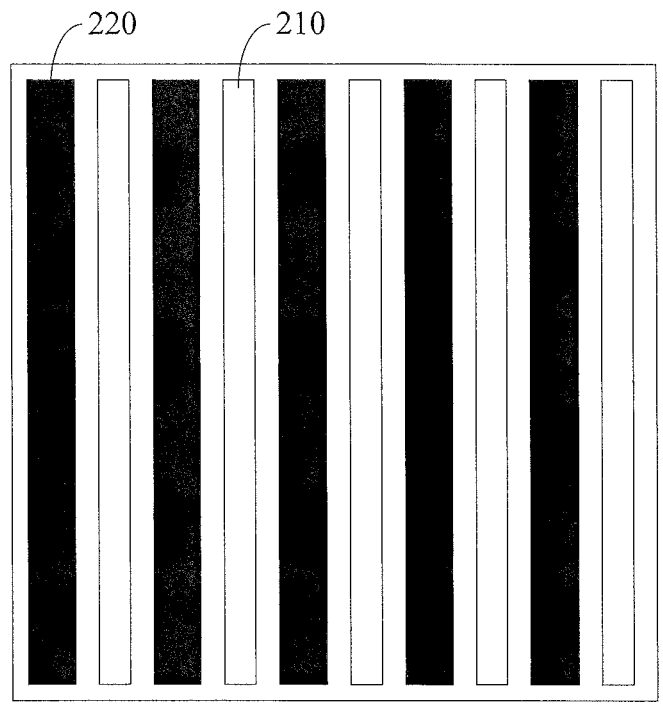
FIG. 5 is an illustrative plan view of the light guide plate of FIG. 4 according to an exemplary embodiment.

In an exemplary embodiment, as shown in FIG. 5, the transmission protrusions 210 and the reflection sheets 220 are alternately arranged in an array having one row and a plurality of columns inside the light guide plate body 200. That is, the transmission protrusions 210 and the reflection sheets 220 each is shaped as a strip.

Figure 6:
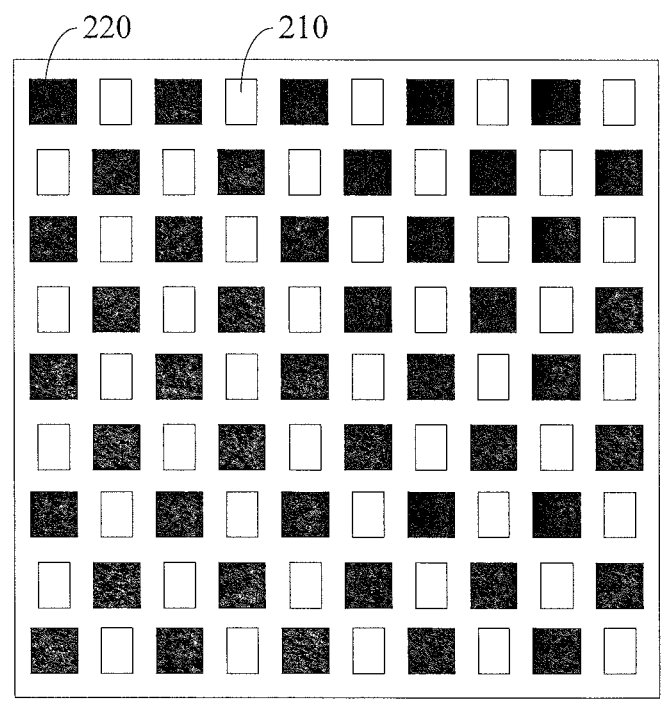
FIG. 6 is an illustrative plan view of the light guide plate of FIG. 4 according to another exemplary embodiment.

In order that the light can be evenly emitted from the light guide plate body 200 by means of the external light source, in another exemplary embodiment, as shown in FIG. 6, the transmission protrusions 210 and the reflection sheets 220 each are shaped as a square block, and the transmission protrusions 210 and the reflection sheets 220 are alternately arranged in an array having a plurality of rows and a plurality of columns inside the light guide plate body 200. With this configuration, the transmission protrusions 210 and the reflection sheets 220 are separated from each other and alternately arranged in each row and each column. As a result, the light passing through one transmission protrusion 210 can be reflected by the reflection sheets 220 surrounding the one transmission protrusion 210. Similarly, the light reflected by one reflection sheet 220 can be emitted from the light guide plate body 200 through the transmission protrusions 210 surrounding the one reflection sheet 220. In this way, the light emitted from the light guide plate body 200 is distributed more evenly, improving the visual effect.

In an exemplary embodiment, the transmission protrusion 210 has a substantial trapezoid cross section, so that the side surface of the transmission protrusion 210 has a slope and facilitates the reflection of the light emitting from the light source 230. In another exemplary embodiment, the transmission protrusion 210 may be shaped as a circular truncated cone or a hexahedron, and a lower bottom surface thereof adjacent to the bottom surface S is larger than an upper top surface thereof opposite to the lower bottom surface.

Figure 7:
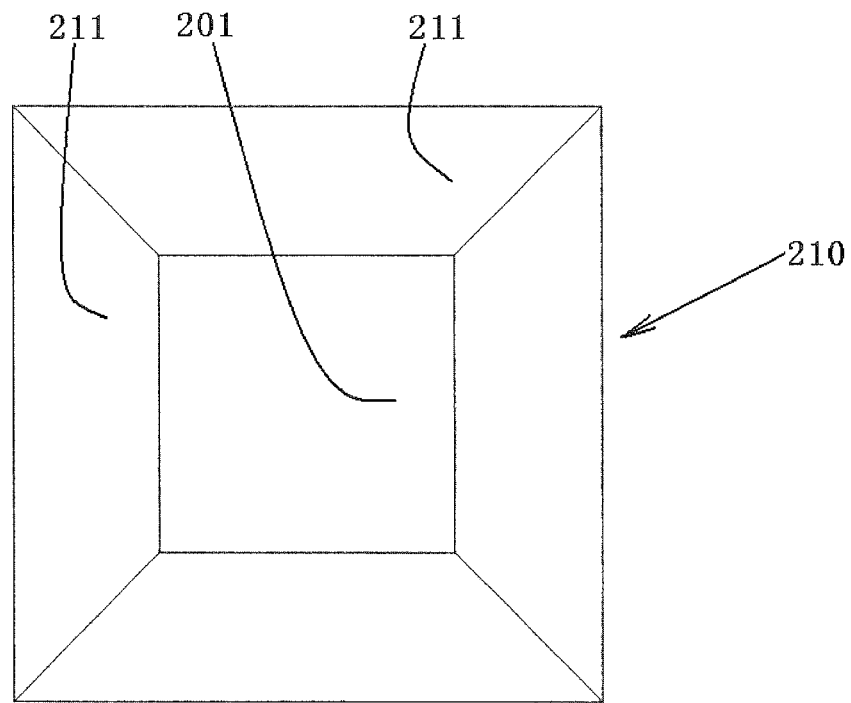
FIG. 7 is an illustrative top view of the transmission protrusion of the light guide plate of FIG. 6.

FIG. 7 shows an exemplary embodiment in which the transmission protrusion 210 is shaped as a hexahedron. As shown in FIG. 7, the hexahedron comprises a lower bottom surface, an upper top surface parallel to the lower bottom surface, and four side surfaces. The lower bottom surface and the upper top surface both are parallel to the bottom surface S of the light guide plate body 200. The lower bottom surface is located adjacent to the bottom surface S of the light guide plate body 200 and larger than the upper top surface in area. In an exemplary embodiment, in order that the light can be evenly exit from the light guide plate body 200, the side surfaces of the transmission protrusion 210 have an equal angle with respect to the lower bottom surface.

In an exemplary embodiment, the opening area of the transmission protrusion 210 at the lower bottom surface may be substantially equal to the area of the reflection sheet 220.

In another aspect of the present invention, there is also provided a back light module comprising the light guide plate according to the above embodiments. If the internal light source is adopted, the back light module further comprises a drive circuit for driving the internal light source.

Figure 8:
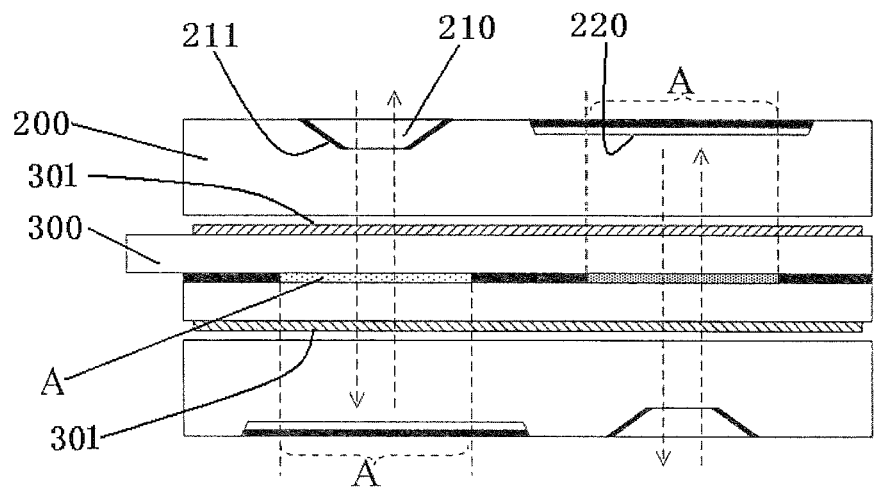
FIG. 8 is an illustrative local cross section view of a display apparatus according to an exemplary embodiment of the present invention.
Figure 9:
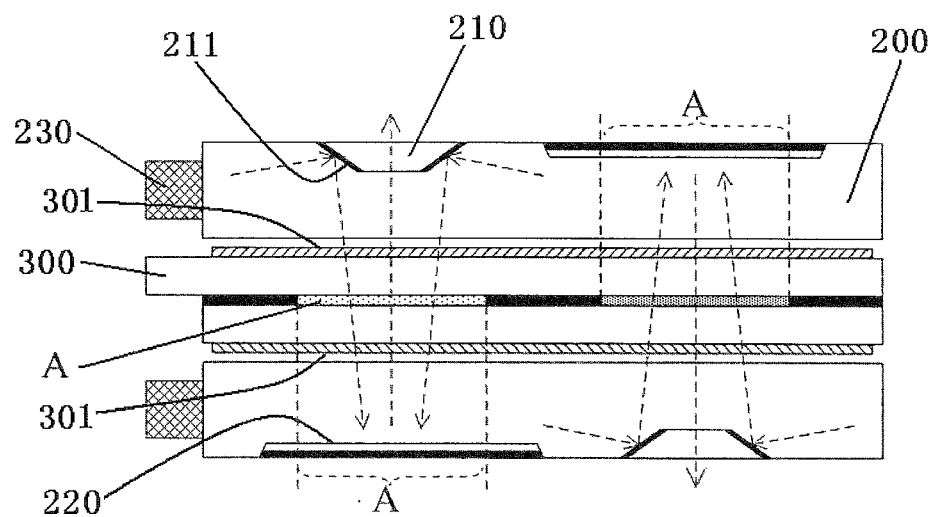
FIG. 9 is an illustrative local cross section view of a display apparatus according to another exemplary embodiment of the present invention.
Figure 10:
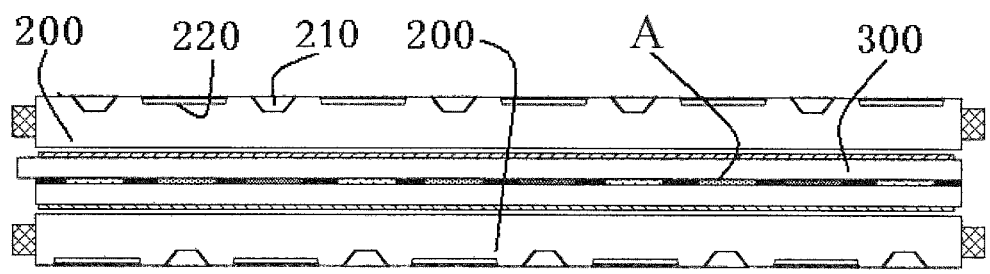
FIG. 10 is an illustrative entire cross section view of the display apparatus of FIG. 8.

As shown in FIGS. 8-10, in another aspect of the present invention, there is also provided a display apparatus comprising a display panel 300 having two light transmission surfaces 301 opposite to each other and two back light modules according to the above embodiments. The display panel may be a conventional liquid crystal display panel. The two back light modules are disposed at sides of the two light transmission surfaces 301, respectively. The surface of the respective light guide plate body 200 opposite to the bottom surface S thereof is located adjacent to the respective light transmission surface 301 of the display panel 300.

In an exemplary embodiment, as shown in FIG. 8, the light transmission regions 201 and reflection sheets 220 of one, for example, the upper light guide plate shown in FIG. 8, of two light guide plates are in correspondence to respective pixel electrode regions A of the display panel 300. One pixel electrode region A, for example, located at the left side, corresponding to the light transmission regions 201 of the one of two light guide plates is in correspondence to or aligned with the reflection sheets 220 of the other, for example, the lower light guide plate shown in FIG. 8, of two light guide plates. Another pixel electrode region A, for example, located at the right side, corresponding to the reflection sheets 220 of the one of two light guide plates is in correspondence to or aligned with the light transmission regions 201 of the other of two light guide plates. In an exemplary embodiment, the number of the pixel electrode regions A corresponding to respective one light transmission regions 201 or respective one reflection sheets 220 may be one or more. In order that the light can evenly be directed into and led out the display panel 300 to improve the display effect, the number of the pixel electrode regions A corresponding to the respective one light transmission region 201 may be equal to the number of the pixel electrode regions A corresponding to the respective one reflection sheet 220.

As shown in FIGS. 8-9, the surface of each of the two light guide plate bodies 200 opposite to the bottom surfaces S thereof is disposed proximal to the display panel 300. The transmission protrusions 210 and reflection sheets 220 of one of two light guide plate bodies 200 correspond to the respective pixel electrode regions A of the display panel 300. One pixel electrode regions A corresponding to the transmission protrusions 210 of the one of two light guide plate bodies 200 correspond to the reflection sheets 220 of the other of two light guide plate bodies 200. Another pixel electrode regions A corresponding to the reflection sheets 220 of the one of two light guide plate bodies 200 correspond to the transmission protrusions 210 of the other of two light guide plate bodies 200.

In a case where the external light source is adopted, as shown in FIG. 8, the light from the external light source is indicated by the broken line arrow. The light transmitting through the first light guide plate (the upper light guide plate in FIG. 8) at the transmission protrusion of the first light guide plate can be directed into and led out the display panel 300, then the light led out the display panel is irradiated on and reflected back by the reflection surface of the reflection sheet 220 of the second light guide plate (the lower light guide plate in FIG. 8), and the reflected light is further transmitted through the display panel 300 and emitted from the respective transmission protrusion of the first light guide plate. In this way, the reflection sheet of the second light guide plate can prevent the light transmitting through the transmission protrusion of the first light guide plate from being emitted from the second light guide plate. As a result, one surface of the display panel 300 facing the first light guide plate can display the image, and the other surface of the display panel 300 facing the second light guide plate also can display the image.

In a case where the internal light source 230 is adopted, as shown in FIG. 9, the light from the internal light source 230 is indicated by the broken line arrow. The light from the internal light source 230 is reflected by the reflection coating layer 211 on the side surface of the transmission protrusion 210 of the first light guide plate (the upper light guide plate in FIG. 9), and transmitted to the reflection surface of the reflection sheet 220 of the second light guide plate (the lower light guide plate in FIG. 9), then is reflected back and led out the transmission protrusion 210 of the first light guide plate. The display principle for the case of the internal light source 230 is similar to the case of the external light source, and the description thereof is omitted herein.

In the light guide plate having the transmission protrusions, the transmission protrusion may be abutted with the reflection sheets around the transmission protrusion, or separated from the reflection sheets by a certain interval region. Since the transmission protrusions and the reflection sheets both just correspond to the pixel electrode regions A, and the interval region just corresponds with or aligned with the black matrix in the display panel, the light cannot transmit through the interval regions on both display surfaces of the display panel, improving the display effect.

In the back light module according to the above embodiments, the transmission protrusions and the reflection sheets are alternately arranged inside the light guide plate. The transmission protrusion is configured so that the light is directed into the display panel from one side surface of the display apparatus, and the reflection sheet is configured to reflect the light transmitting through the display panel and prevent the light at the other side surface of the display apparatus from transmitting through the reflection sheet and interfering with the display on the one side surface. As a result, both side surfaces of the display apparatus can independently display images, achieving the double-surface display function.

In this exemplary embodiment, the display apparatus comprises the above light guide plate and has the double-surface display function. FIG. 10 is an illustrative view of the display apparatus. The display apparatus may be any product or member having the display function, such as, liquid crystal panel, electronic paper, OLED panel, mobile telephone, panel computer, TV, display, notebook computer, digital picture frame, navigator, etc.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle, so that more kinds of light guide plate can be achieved with overcoming the technical problem of the present invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display apparatus, comprising:
a display panel having two light transmission surfaces opposite to each other; and
two back light modules comprising a light guide plate, the light guide plate comprising:
a transparent light guide plate body;
a plurality of reflection sheets disposed inside the light guide plate body adjacent to a bottom surface of the light guide plate body; and
at least one light source provided on at least one side surface of the light guide plate body perpendicular to the bottom surface,
wherein a surface of the reflection sheet away from the bottom surface is configured as a reflection surface,
wherein regions of the light guide plate body except the reflection sheets are configured as light transmission regions,
wherein the light transmission regions and the reflection sheets are alternately arranged,
wherein a plurality of transmission protrusions are disposed at the light transmission region inside the light guide plate body, the transmission protrusion comprising a lower bottom surface and an upper top surface parallel to the lower bottom surface, which are constructed to allow light to transmit therethrough, so that the light transmits through the bottom surface and a top surface opposite to the bottom surface of the light guide plate body, and
wherein a reflection coating layer is formed on side surfaces of each of the transmission protrusion, so that light from the light source is emitted from the top surface after being reflected by the reflection coating layer,
wherein the two back light modules are disposed at sides of the two light transmission surfaces, respectively,
wherein the surface of the respective light guide plate body opposite to the bottom surface thereof is located adjacent to the respective light transmission surface of the display panel,
wherein the light transmission regions and reflection sheets of one of two light guide plates correspond to respective pixel electrode regions of the display panel,
wherein the pixel electrode regions corresponding to the light transmission regions of the one of two light guide plates correspond to the reflection sheets of the other of two light guide plates, and
wherein the pixel electrode regions corresponding to the reflection sheets of the one of two light guide plates correspond to the light transmission regions of the other of two light guide plates, so that the light transmitting through the one of two light guide plates at the transmission protrusion of the one of two light guide plates is directed into the led out the display panel, then the light led out the display panel is irradiated on the reflected back by the reflection surface of the reflection sheet of the other of the two light guide plates, and the reflected light is further transmitted through the display panel and emitted from the respective transmission protrusion of the one of two light guide plates.

2. The display apparatus according to claim 1,
wherein a number of the pixel electrode regions corresponding to the light transmission regions is equal to a number of the pixel electrode regions corresponding to the reflection sheets.

3. The display apparatus according to claim 1,
wherein the transmission protrusions and the reflection sheets are alternately arranged in an array having one row and a plurality of columns inside the light guide plate body.

4. The display apparatus according to claim 1,
wherein the transmission protrusions and the reflection sheets are alternately arranged in an array having a plurality of rows and a plurality of columns inside the light guide plate body.

5. The display apparatus according to claim 1,
wherein the transmission protrusion is shaped as a hexahedron having a trapezoid cross section and further comprises four side surfaces, and the lower bottom surface is located adjacent to the bottom surface of the light guide plate body and larger than the upper top surface in area.

6. The display apparatus according to claim 1,
wherein a first non-reflection coating layer is formed on a surface of the reflection sheet facing the bottom surface.

7. The display apparatus according to claim 1,
wherein the reflection sheets are evenly distributed inside the light guide plate body.

8. The display apparatus according to claim 1,
wherein a second non-reflection coating layer is formed between the side surfaces of the transmission protrusion and the reflection coating layer.

9. The display apparatus according to claim 1,
wherein the transmission protrusion has a substantial trapezoid cross section.

10. The display apparatus according to claim 9,
wherein the side surfaces of the transmission protrusion have an equal angle with respect to the lower bottom surface.

\* \* \* \* \*